United States Patent
Werman et al.

(10) Patent No.: US 7,520,693 B2
(45) Date of Patent: Apr. 21, 2009

(54) SCREW BOSS WITH SNAP FITTING

(75) Inventors: Reben Werman, Sterling Heights, MI (US); Takahira Kato, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 91 days.

(21) Appl. No.: 11/708,167

(22) Filed: Feb. 15, 2007

(65) Prior Publication Data

US 2008/0197258 A1    Aug. 21, 2008

(51) Int. Cl.
*F16D 1/00* (2006.01)
(52) U.S. Cl. .............. 403/408.1; 403/14; 403/329; 403/337
(58) Field of Classification Search ........... 403/11, 403/13, 14, 326, 329, 335, 337, 408.1
See application file for complete search history.

(56) References Cited

U.S. PATENT DOCUMENTS

| | | | | |
|---|---|---|---|---|
| 5,350,320 A | * | 9/1994 | Hashizawa et al. | 439/752 |
| 5,577,860 A | * | 11/1996 | Plank | 403/11 |
| 6,099,190 A | * | 8/2000 | Honobe et al. | 403/13 |
| 7,360,779 B2 | * | 4/2008 | Crandall | 280/163 |
| 7,390,139 B2 | * | 6/2008 | Walls et al. | 403/408.1 |
| 2005/0074276 A1 | * | 4/2005 | Luetze et al. | 403/14 |

FOREIGN PATENT DOCUMENTS

| | | | |
|---|---|---|---|
| DE | 37 01 004 | * | 3/1987 |
| EP | 0 083 519 | * | 11/1982 |

* cited by examiner

*Primary Examiner*—Michael P Ferguson
(74) *Attorney, Agent, or Firm*—Harness, Dickey & Pierce, PLC

(57) ABSTRACT

A connection joint employs a first piece defining a protruding boss and a threaded hole. A second piece resides over the first piece and has a through hole that corresponds to the boss and aligns with the hole in the first piece. A bevel at the end of the second piece is utilized to initially contact the boss during installation of the second piece over the first piece. The second piece biases and then snaps into place to permit a tight and secured fit of the second piece on the first piece. A third piece that lies upon the second piece, the third piece defining a third hole that is aligned with the first and second holes. In aligning the hole of the third piece with that of the first and second, the third piece may abut the boss. A threaded screw through the holes holds the three pieces together.

6 Claims, 4 Drawing Sheets

SCREW BOSS WITH SNAP FITTING

FIELD

The present disclosure generally relates to a snap fitting to join parts. More specifically, the present disclosure relates to a snap fitting that is used in conjunction with a screw to join parts.

BACKGROUND

The statements in this section merely provide background information related to the present disclosure and may not constitute prior art. Instrument clusters of automobiles generally include a plurality of gauges for displaying operational information such as vehicle speed, engine RPM, engine temperature, fuel level and other information related to driving or vehicle conditions. Many of such gauges are analog and typically include an assembly of a multitude of parts including, but not limited to: a faceplate; inner, outer and upper window plates; and various other intermediary components that ultimately mount to a case located at the rear of the assembled gauge structure. While such gauge assemblies have generally proven satisfactory for their applications, each is associated with its share of limitations.

One limitation of current gauge assembly structures involves maintaining connection of a limited number of gauge parts of an intermediate assembly before a subsequent assembly of additional parts to arrive at the overall or complete gauge assembly. What is needed then is a device that permits an intermediate assembly of parts to maintain is intermediate assembled structure before the assembly of additional parts.

SUMMARY

A connection joint, such as may be used in construction of an automotive instrument panel, joins pieces together. A first piece, such as a rear case, defines a projection such as a rectangular boss and a threaded through hole. A second piece defines a rectangular first hole within which the projection may reside while a bevel on the second piece facilitates biasing of the second piece during installation of the second piece over the boss. Upon biasing of the second piece over the first piece, the second piece lies securely snapped in place against the first piece so as not to become dislodged from the first piece. The projection may or may not protrude above the second piece when the second piece is installed upon the first piece.

The first piece may further define a second hole, which may be threaded and be in alignment with the first hole of the second piece. A third piece defining a third hole that aligns with the first and second holes may lie upon the second piece when the third piece is installed over the second piece. A threaded screw with a head may pass through the first, second and third holes to secure the first, second and third pieces as a secured joint.

Because the first and second pieces fit together with a snap connection, the two piece connection joint may be maneuvered into any position without risk of the joint failing and the first and second pieces coming apart. The integrity of the two piece snap fitting permits movement of the intermediate assembly to a final assembly location where the third piece may be screwed onto the intermediate assembly as the threaded screw engages the threads of the second hole of the first piece. The three pieces may be secured against the screw head.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
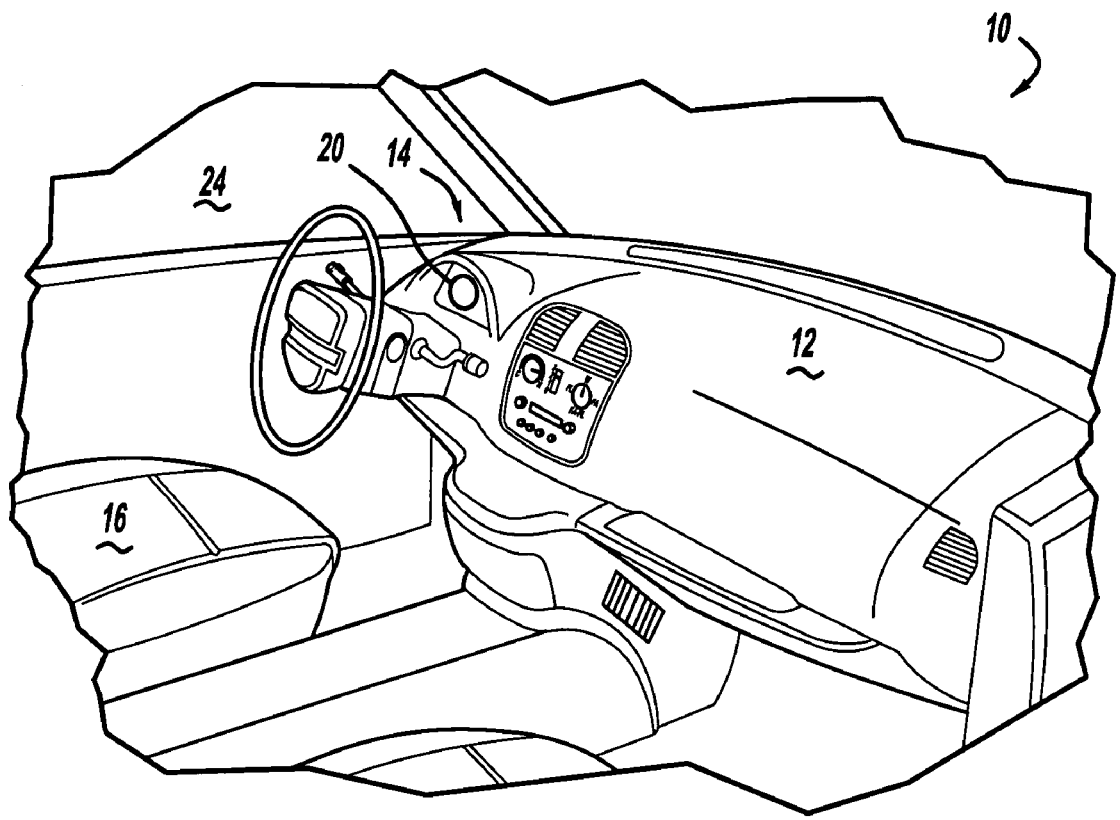
FIG. 1 is a perspective view depicting a vehicle interior.

The following description is merely exemplary in nature and is not intended to limit the present disclosure, application, or uses. It should be understood that throughout the drawings, corresponding reference numerals indicate like or corresponding parts and features.

With initial reference to FIG. 1, depicted is a vehicle 10, such as an automobile, having a dash 12 and an instrument cluster 14, both of which may be situated in front of a driver's seat 16 in the interior cabin 18 of the vehicle 10. As part of the instrument cluster 14, a viewed component 20 is depicted. The viewed component 20 may be exemplified by a speedometer, and also may be herein referred to as a gauge or indicating instrument. It is appreciated that the viewed component 20 may be exemplified by other gauges, dials or instruments such as, but not limited to, tachometers, fuel gauges, temperature gauges, oil pressure gauges, etc.

Figure 2:
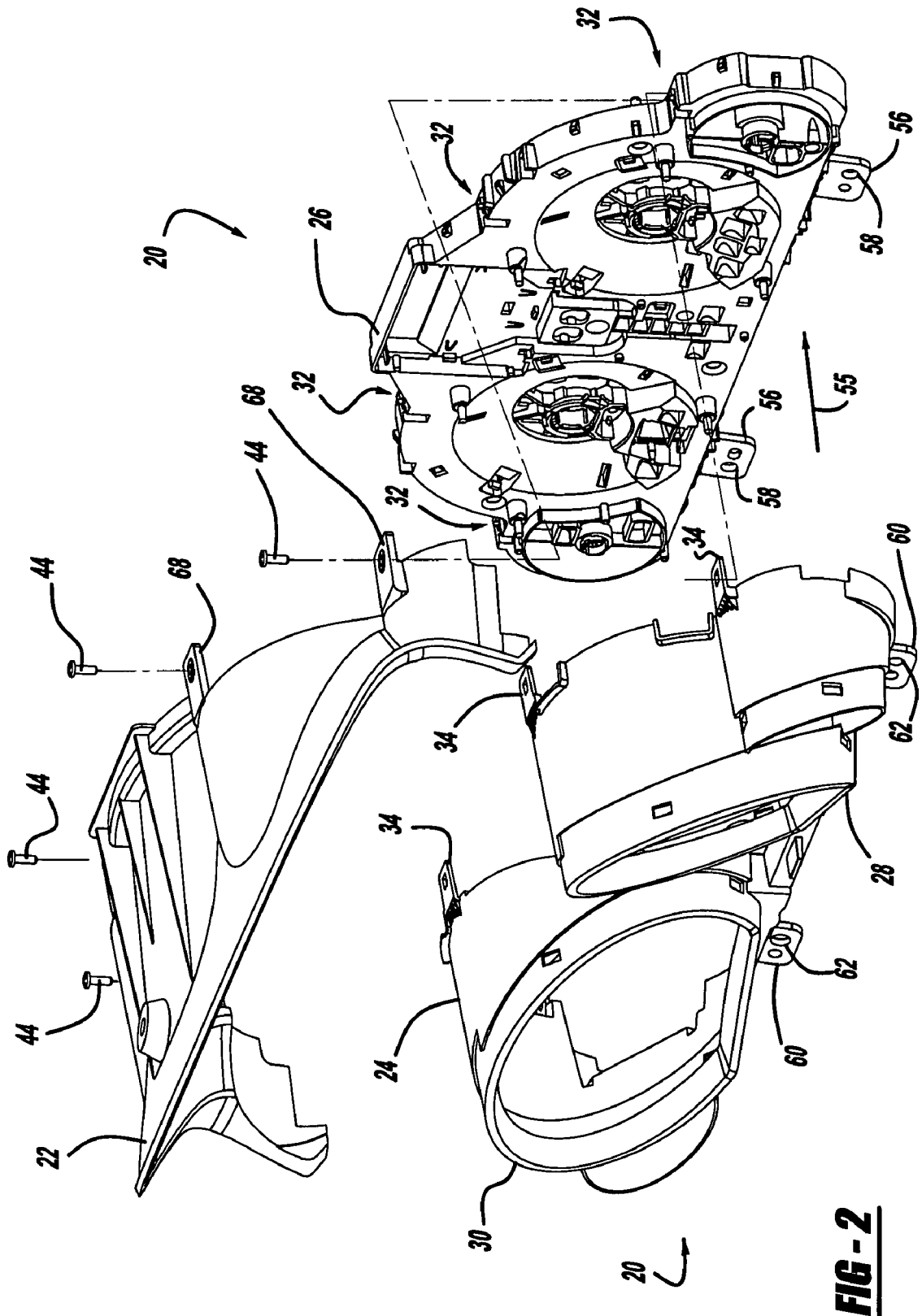
FIG. 2 is an exploded view depicting an assembly of components of a vehicle gauge.

Turning now to FIG. 2, a partial exploded view of the viewed component 20 is depicted. FIG. 2 is referred to as a partial exploded view because only specific connecting parts of an upper window plate 22, outer window plate 24 and a case 26 are generally depicted. However, between the upper window plate 22 and outer window plate 24, separate and additional parts such as a speedometer ring and tachometer ring may be employed. Such parts may be installed over the speedometer area 28 and tachometer area 30 of the outer window plate 24.

Similar to parts residing between the upper window plate 22 and outer window plate 24, a multitude of separate and distinct parts also may reside between the outer window plate 24 and the case 26. Such parts may be: speedometer and tachometer glass fronts, fuel and temperature gauge glass fronts, a mid glass front, an inner window plate, a center dial, minor and major LCDs, small and large LCD diffuser prisms, a bulb reflector, minor dials for the speedometer and tachometer, bulb reflectors for the speedometer and tachometers, computer assemblies for the speedometer and tachometer, pointer assemblies for corresponding speedometer, tachometer, fuel and temperature dials, prisms and prism covers for the speedometer and tachometer, and a backlighting prism.

Figure 6:
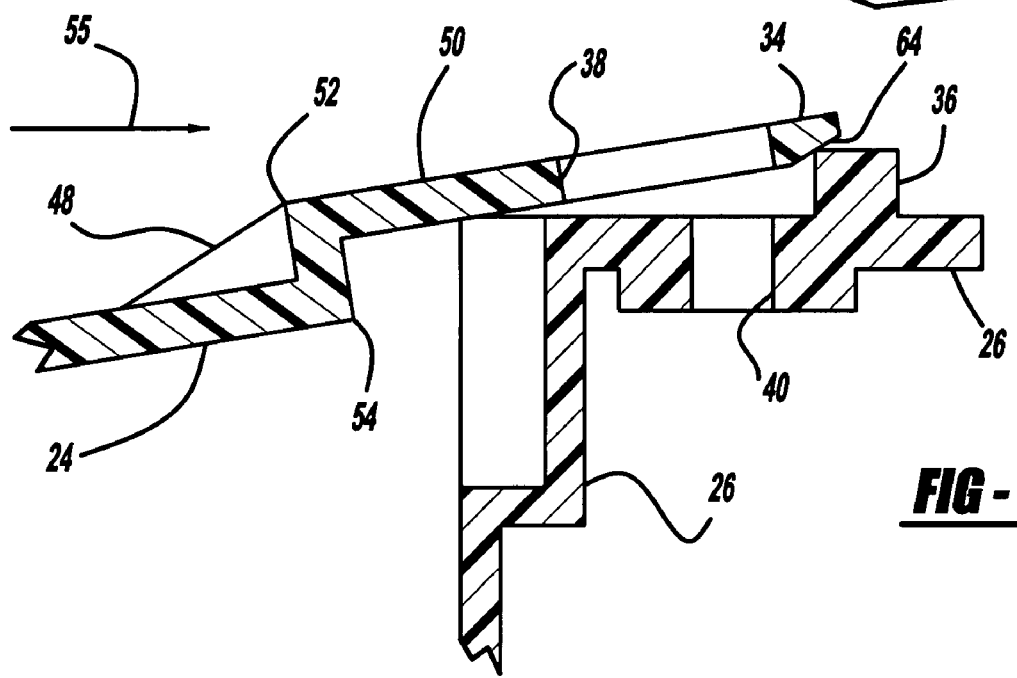
FIG. 6 is a cross-sectional view of initiation of a connection of the boss tab of the outer window plate and the screw boss of the case.

Continuing with FIG. 2, upon the case 26, connection points 32 are depicted that correspond to boss tabs 34 on the outer window plate 24. Although multiple connection points 32 are depicted on FIG. 2, only one will generally be referred to through the description of the present teachings of the invention, as each location of a connection point is generally the same. Continuing briefly with reference to FIG. 6, the boss tab 34, when forced, passes over and becomes situated upon a boss 36 of the case 26 such that the boss tab 34 encompasses the boss 36 to the extent that the boss 36 protrudes through the hole 38 of the boss tab 34. Continuing with FIG. 3, which is an enlarged view of a connection point 32 near the top of the case 26, the case 26 has a threaded hole 40 that passes through a wall or surface 46 of the case 26. The boss 36 is situated adjacent to the hole 40 such that the boss 36 may have a curved or concave surface 42 in it to provide clearance for a screw 44 (FIG. 4).

Figure 3:
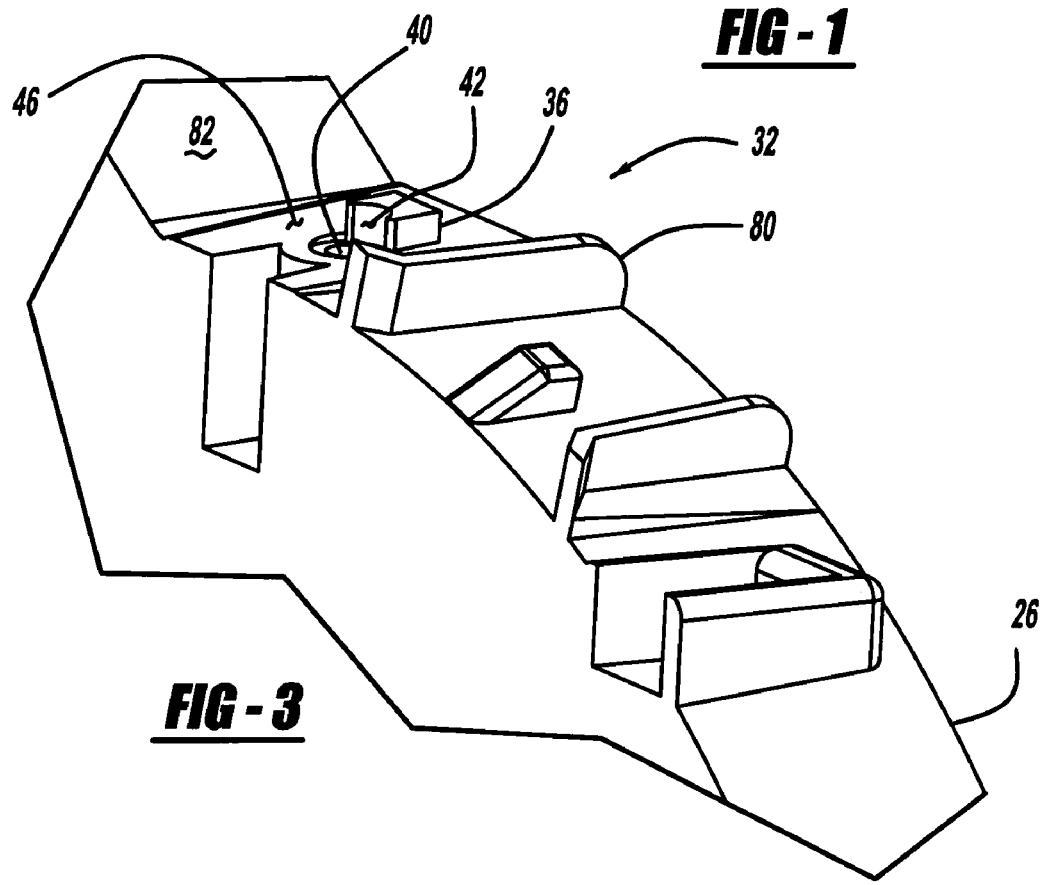
FIG. 3 is a perspective view of a screw boss on a gauge case of a gauge assembly.
Figure 4:
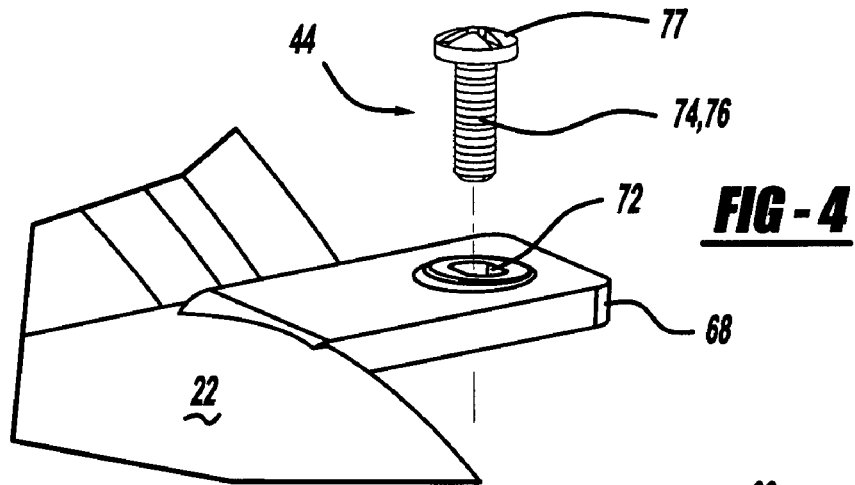
FIG. 4 is a perspective view of a screw tab on an upper window plate of a gauge assembly.
Figure 5:
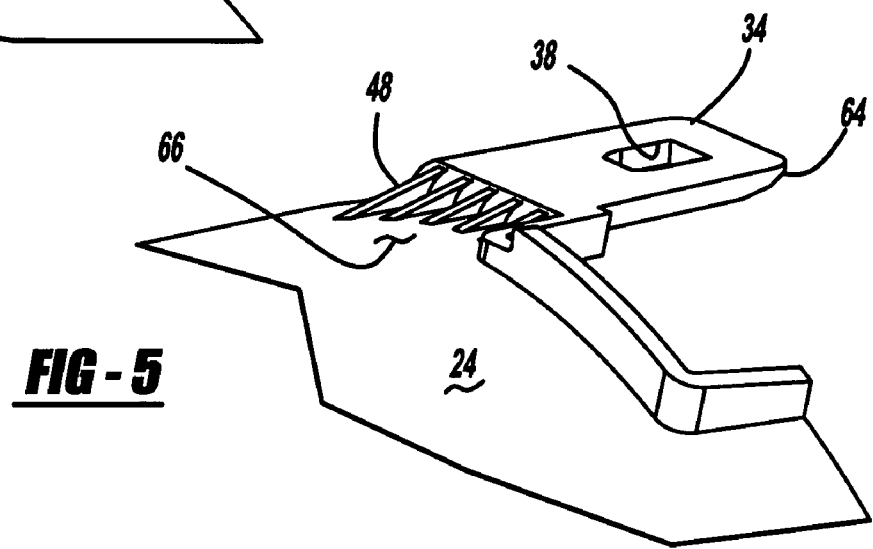
FIG. 5 is a perspective view of a boss tab on an outer window plate of a gauge assembly.

As depicted in FIG. 3, the concave surface 42 may follow the contour of the hole 40 to accommodate the screw 44. The boss 36 and hole 40 lie on or in a surface 46 of the case 26 that also permits the boss tab 34 to lie flat on the surface 46 upon completion of installation of the boss tab 34. With reference to FIG. 5, the outer window plate 24 may have ribs 48 to provide support to the boss tab 34, such as during installation of the outer window plate 24 when the boss tab 34 may experience bending. More specifically, the ribs 48 provide support to the boss tab 34 at the end of the boss tab 34 closest to the ribs 48, such as at location 50 of the boss tab 34. Furthermore, the ribs 48 provide rigidity to the corners 52, 54 of the boss tab 34 that are proximate to the case 26, where such boss tab 34 may be prone to cracking in the absence of such ribs 48.

Installation of the boss tab 34, and on a larger scale the outer window plate 24, onto the case 26 will now be described. First, with reference to FIG. 2, the outer window plate 24 is positioned in front of the case 26 as depicted such that the boss tabs 34 of the outer window plate 24 are in alignment with the connection points 32 of the case 26. The outer window plate 24 is then moved toward the case 26 in accordance with arrow 55 (FIGS. 2 and 6) such that the tab 56 and hole 58 of the case 26 are aligned with the tab 60 and hole 62 of the outer window plate 24 such that the tabs 56, 60 may be secured with a screw (not shown) to secure the surfaces of the tabs 56, 60 together. As the holes 58, 62 of the tabs 56, 60 are aligned, the boss tab 34 of the outer window plate 24 approaches the boss 36 of the case 26. The boss tab 34 may have a bevel 64 on its end to direct the boss tab 34 over the boss 36 so that the boss tab 34 may "snap" over the boss 36 to permit the boss 36 to reside within the hole 38 of the boss tab 34. When the boss tab 34 biases upward to permit the boss 36 to slide under the boss tab 34 during installation of the outer window plate 24, the ribs 48 provide strength to the connection of the boss tab 34 to the outer window plate 24 and promote stress and flexure at area 66 of the outer window plate 24. Without the ribs 48, stress due to flexure may occur at corners 52, 54 which may promote cracking of the outer window plate 24. As there are no sharp corners at area 66, the upward bending is consistent, while the resiliency of the plastic permits the boss tab 34 to return to its un-flexed location and reside around the boss 36 upon completion of installation of the outer window plate 24, as depicted in FIG. 7.

With the boss tab 34 securely snapped into place around the boss 36, the outer window plate 24, case 26 and all parts residing in between, may be manipulated before the installation of any additional parts. Thus, an advantage of the snap fit of the outer window plate 24 to the case 26 is that such a sub-assembly may be freely moved, without disruption or dislocation of any parts thus assembled, before further assembly of other parts to both, the outer window plate 24 and the case 26.

With the assembly of the outer window plate 24 to the case 26, the installation of the upper window plate 22 may then be accomplished. With reference first to FIG. 2, when the upper window plate 22 is installed, it secures over the boss tabs 34 of the outer window plate 24. More specifically, and with reference to an individual instance of the screw tab 68 using FIGS. 7 and 8, the screw tab 68 of the upper window plate 22 may be positioned over the boss tab 34 of the outer window plate 24 in accordance with directional arrow 70 of FIG. 7. When the screw tab 68 of the upper window plate 22 is in position, the hole 72 through the screw tab 68 aligns with the hole 38 through the boss tab 34 and the hole 40 through the case 26. With the holes 72, 38, 40 in alignment, the screw 44 may be installed in the holes 72, 38, 40 to secure the upper window plate 22, outer window plate 24 and case 26 together. Regarding the screw 44, threads 74 on the shaft 76 permit the case 26 to be drawn toward the head 77 of the screw 44 as the screw 44 is turned. Thus, the hole 40 of the case 26 may have corresponding threads. Additionally, the holes 72, 38 of the screw tab 68 may also have threads, although they are not required to secure the structure, but may provide added strength and reduce movement between the parts 22, 24, 26. An advantage of securing the upper window plate 22, outer window plate 24 and case 26 using a screw 44 with corresponding threads in at least the case 26 is that a connection of parts 22, 24, 26 free of rattles may be created.

Figure 7:
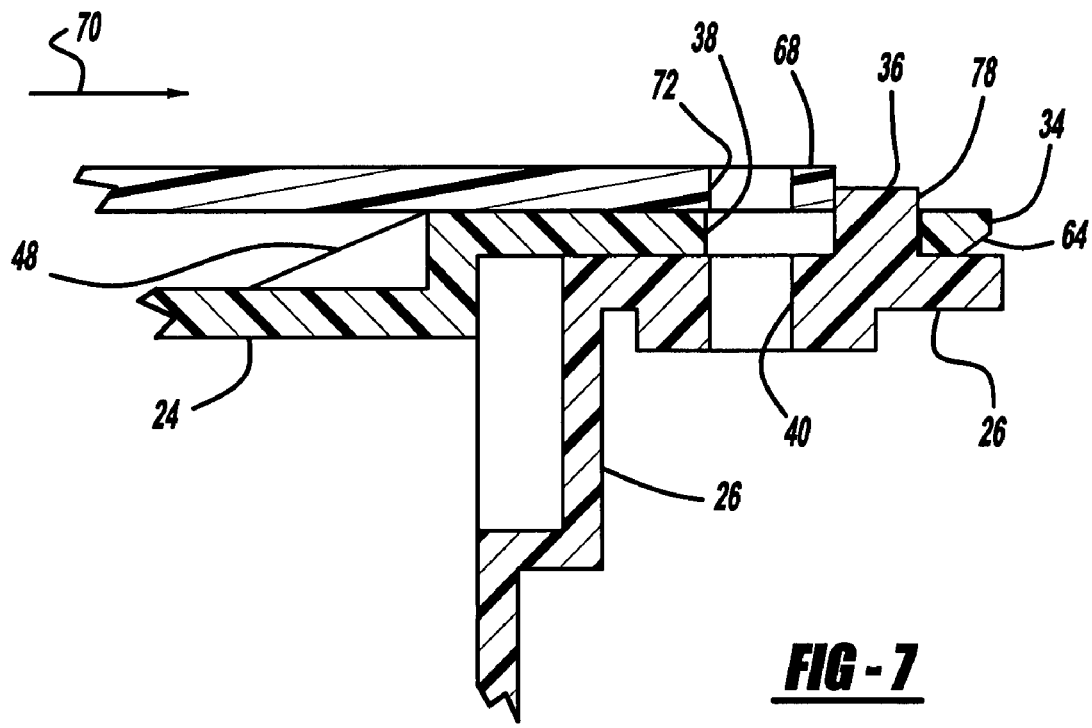
FIG. 7 is a cross-sectional view of a connection of the screw tab of the upper window plate, the boss tab of the outer window plate, and the boss of the case.
Figure 8:
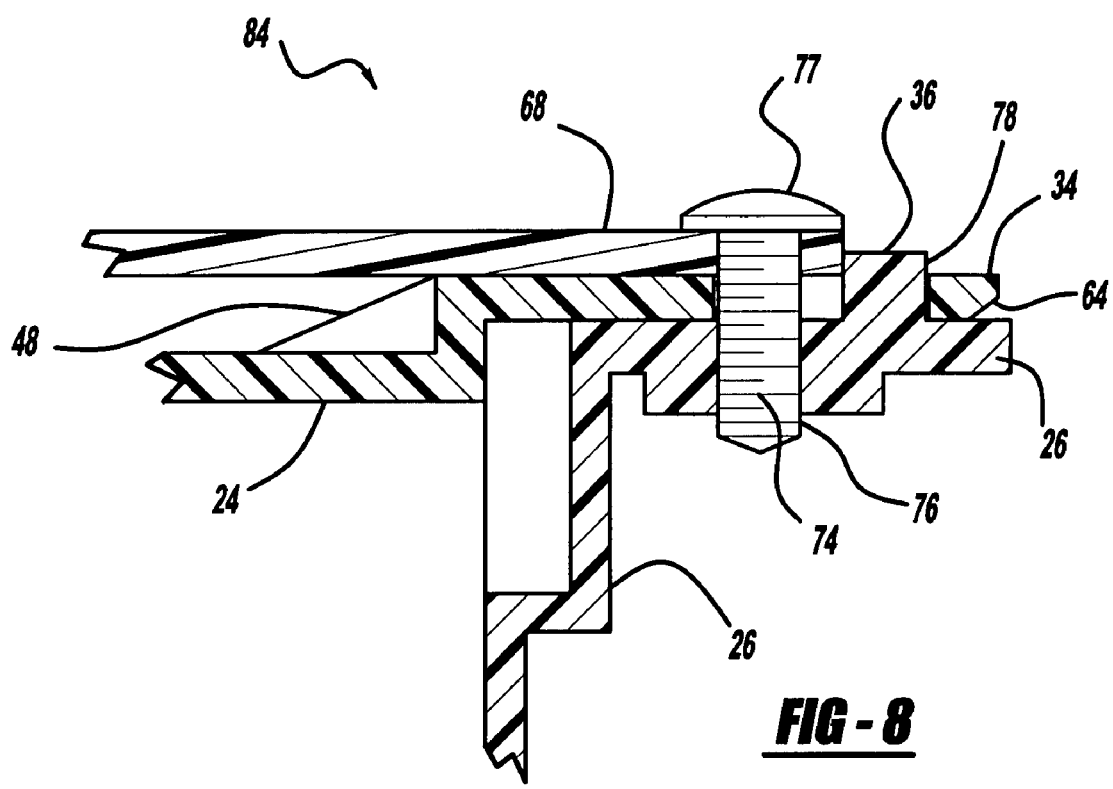
FIG. 8 is a cross sectional view of a connection of the screw tab of the upper window plate, the boss tab of the outer window plate, and the case.

With further reference to FIGS. 7 and 8, the boss 36 is depicted as rising above the surface of the boss tab 34. There are at least two advantages to such a structure. One advantage is that the boss tab 34 will be more securely positioned around the boss 36 in proportion to the extent that the boss 36 protrudes beyond a top surface of the boss tab 34, thus lowering the possibility that the boss tab 34 might dislodge from the boss 36. However, because the outer window plate 24 is also secured with tabs 56, 60 and an accompanying fastener, such as a screw, the boss 36 and accompanying boss tab 34 create a secure snap fit.

Another advantage is that with a protruding portion 78 of the boss 36 protruding slightly above the surface of the boss tab 34, the installation of the upper window plate 22 may be easier than without the protruding portion 78. Such is the case because the screw tab 68 contacts the protruding portion 78 of the screw boss 36 to perfectly align holes 72, 38, 40 to make installation of the screw 44 easier. Such automatic alignment of the holes 72, 38, 40 before screw insertion speeds assembly time as opposed to a situation where the hole 72 has to be aligned in a more time consuming manual manipulation, such as without the protruding portion 78 of the boss 36.

Upon successful completion of the connection joint 84 as depicted in FIG. 8, additional advantages of the teachings of the invention become evident. For instance, with reference to FIG. 3, the case 26 has a first wall 80 and a second wall 82 between which the boss tab 34 and the screw tab 68 reside when in their respective installed positions over and adjacent the boss 36. When the boss tab 34 and screw tab 68 are installed, a close tolerance exists between the parts 34, 68 and the first wall 80. Because of the close tolerance between the tabs 34, 68 and the first wall 80, the connection joint 84 is held in its as-connected position, that is, no part of the finished joint 84 is permitted to rotate because of the first wall 80. Similarly, the second wall 82, on the opposite side of the connection point 32 as the first wall 80, performs a similar function. Although the second wall 82 is not as close to being perpendicular to the surface 46 as the first wall 80, the second wall 82 also prevents rotation or movement of the connection joint 84 (FIG. 8).

Continuing with advantages of the invention and with reference to FIG. 3, the boss 36 is depicted as being predominantly rectangular with a semi-circular or concave surface 42 that lies immediately adjacent to, or creates an uninterrupted transition with the hole 40. An advantage of such a boss 36 is that when the boss tab 34 is forced over the boss 36, the rounded or square corners of the hole 38 (FIG. 5) fit snugly around the rounded or square corners of the boss 36 to prevent rotation or other movement of the boss tab 34 on the boss 36. Such a structure assures a snug and rattle-free joint 84 that is further assured by the installation of the screw 44 through holes 72, 38, 40 of the joint 84.

What is claimed is:

1. A connection joint comprising:
   a first piece that defines a boss projecting from a planar surface;
   a second piece that defines a first planar portion that lies against the planar surface of the first piece, the first planar portion defining a first through hole within which the boss resides when the first portion is slid onto the planar surface such that the first portion resiliently flexes to pass over the boss, the second piece further defining a second planar portion having a first end perpendicularly extending from an end of the first planar portion, the second piece further defining a third planar portion parallel to the first planar portion and perpendicularly extending from a second end of the second planar portion;
   a plurality of strengthening ribs extending between the second portion and the third portion to provide strength to a connection of the first planar portion and the third planar portion;
   a bevel on the first portion of the second piece that initially contacts the boss and permits a part of the second piece to resiliently flex and pass over the boss,
   wherein the first piece further defines a second hole, wherein the second hole is threaded and is aligned with the first hole when the boss is received within the first hole;
   wherein the boss abuts an inside diameter of the first hole formed by the part of the second piece that passes over the boss, and the second portion abuts against the first piece to create a snug fit between the second piece and the first piece;
   a third piece that lies upon the first planar portion of the second piece opposite the first piece, the third piece defining a third hole that is aligned with the first and second holes when the boss is received with the first hole; and
   a threaded screw that passes through the first, second and third holes when the boss is received within the first hole to secure the first, second and third pieces together.

2. The connection joint of claim 1, wherein an end of the third piece abuts against the boss to align the third hole with the first and second holes.

3. The connection joint of claim 1, wherein the boss has exterior corners that correspond with interior corners of the first hole to prevent rotation.

4. A connection joint comprising:
   a first piece that defines a rectangular projection projecting from a planar surface; and
   a second piece that defines a planar portion that lies against the planar surface of the first piece, the planar portion defining a rectangular first hole within which the projection resides when the planar portion is slid onto the planar surface such that the planar portion resiliently flexes to pass over the projection, wherein the projection protrudes above the second piece and a bevel on the planar portion of the second piece facilitates biasing and resilient flexing of the second piece during installation of the second piece over the projection, the first piece further defines a second hole that is threaded and in alignment with the first hole when the projection is received within the first hole;
   a third piece that lies upon the planar portion of the second piece opposite the first piece, the third piece defining a third hole that aligns with the first and second holes when an end of the third piece abuts against the rectangular projection and the projection is received with the first hole, wherein an inside diameter of the first hole abuts the rectangular projection and the second piece abuts the first piece on a side of the first piece perpendicular to a side of the first piece from which the rectanaular projection protrudes; and
   a threaded screw with a head, wherein the threaded screw passes through the first, second and third holes when the projection is received within the first hole is placed in tension when screwed into the threaded second hole and holds the first, second and third pieces against the head.

5. A connection joint comprising:
   a first piece that defines a rectangular projection projecting from a planar surface; and
   a second piece that defines a planar portion that lies against the planar surface of the first piece, the planar portion defining a rectangular first hole within which the projection resides when the planar portion is slid onto the planar surface such that the planar portion resiliently flexes to pass over projection, wherein the projection protrudes above the second piece and a bevel on the second piece facilitates biasing and resilient flexing of the second piece during installation of the second piece about the projection, the first piece further defines a second hole that is threaded and in alignment with the first hole when the projection is received within the first hole;
   a third piece that lies upon the planar portion of the second piece opposite the first piece, the third piece defining a third hole that aligns with the first and second holes when an end of the third piece abuts against the rectangular projection and the projection is received with the first hole, wherein an inside diameter of the first hole abuts the rectangular projection and the second piece abuts the first piece on a side of the first piece perpendicular to a side of the first piece from which the rectangular projection protrudes to create a snug fit between the first piece and the second piece;
   a plurality of strengthening ribs on the second piece to provide strength to the second piece during flexure of the second piece over the rectangular projection; and
   a threaded screw with a head, wherein the threaded screw passes through the first, second and third holes when the projection is received within the first hole is placed in tension when screwed into the threaded second hole and holds the first, second and third pieces against the head.

6. The connection joint of claim 5, further comprising:
   a concave portion in the rectangular projection that provides for passage of the screw.

* * * * *

UNITED STATES PATENT AND TRADEMARK OFFICE
CERTIFICATE OF CORRECTION

PATENT NO.       : 7,520,693 B2  
APPLICATION NO.  : 11/708167  
DATED            : April 21, 2009  
INVENTOR(S)      : Reben Werman et al.

Page 1 of 1

It is certified that error appears in the above-identified patent and that said Letters Patent is hereby corrected as shown below:

Col. 6, line 34, claim 5, after 2$^{nd}$ occurrence of "the"
    insert --planar portion of the--

Signed and Sealed this

Fourteenth Day of July, 2009

JOHN DOLL  
*Acting Director of the United States Patent and Trademark Office*